(12) United States Patent
Brewer et al.

(10) Patent No.: US 7,380,157 B2
(45) Date of Patent: May 27, 2008

(54) STAGGERED WRITING FOR DATA STORAGE SYSTEMS

(75) Inventors: Michael Allan Brewer, Boulder, CO (US); Robert Arthur Ellis, Nederland, CO (US)

(73) Assignee: Pillar Data Systems, Inc., San Jose, CA (US)

( * ) Notice: Subject to any disclaimer, the term of this patent is extended or adjusted under 35 U.S.C. 154(b) by 500 days.

(21) Appl. No.: 10/975,290

(22) Filed: Oct. 27, 2004

(65) Prior Publication Data
US 2006/0087940 A1    Apr. 27, 2006

(51) Int. Cl.
G06F 11/00    (2006.01)
(52) U.S. Cl. ........................................... 714/6; 711/114
(58) Field of Classification Search ............... 714/5, 714/6, 8, 7; 711/114, 216
See application file for complete search history.

(56) References Cited

U.S. PATENT DOCUMENTS

| | | | |
|---|---|---|---|
| 5,331,646 A | | 7/1994 | Krueger et al. |
| 5,459,853 A | * | 10/1995 | Best et al. .................. 711/114 |
| 5,799,174 A | | 8/1998 | Muntz et al. |
| 6,067,635 A | | 5/2000 | DeKoning et al. |
| 6,076,143 A | | 6/2000 | Blumenau |
| 6,118,790 A | | 9/2000 | Bolosky et al. |
| 6,170,037 B1 | | 1/2001 | Blumenau |
| 6,240,243 B1 | | 5/2001 | Chen et al. |
| 6,332,177 B1 | | 12/2001 | Humlicek |
| 6,397,292 B1 | | 5/2002 | Venkatesh et al. |
| 6,425,052 B1 | | 7/2002 | Hashemi |
| 6,535,869 B1 | * | 3/2003 | Housel, III ................. 707/2 |
| 6,907,505 B2 | * | 6/2005 | Cochran et al. ............ 711/162 |
| 2002/0073276 A1 | * | 6/2002 | Howard et al. ............ 711/113 |
| 2003/0101321 A1 | * | 5/2003 | Ohran ....................... 711/162 |
| 2003/0172149 A1 | | 9/2003 | Edsall et al. |
| 2003/0188097 A1 | | 10/2003 | Holland et al. |

OTHER PUBLICATIONS

Jim Senicka, Brian Duffy, Veritas-vx, Stupid Striping Question, Dec. 28, 2000, pp. 1-2, Veritas-vx maillist, US.
Peter M. Chen, Edward K. Lee, Garth A. Gibson, Randy H. Katz, David A. Patterson, Raid: HIgh-Performance, Reliable Secondary Storage, Jun. 1994, pp. 145-185. ACM Computing Surveys. vol. 26. No. 2. US.

* cited by examiner

Primary Examiner—Dieu-Minh Le
(74) Attorney, Agent, or Firm—Robert Moll

(57) ABSTRACT

The present invention relates to write operations in data storage systems. In an embodiment, the invention relates to a method of writing data across a plurality of disk arrays, including writing a first copy of the data as a first plurality of stripes corresponding to the plurality of disk arrays and writing a second copy of the data as a second plurality of stripes corresponding to the plurality of disk arrays, wherein the second copy of the data is staggered with respect to the first copy on the plurality of disk arrays. In another embodiment, the invention relates to a data storage system including a plurality of disk arrays and a host, coupled to the plurality of disk arrays, with a program that instructs the host to write a first copy of the data as a first plurality of stripes that correspond to the plurality of disk arrays and to write a second copy of the data as a second plurality of stripes that correspond to the plurality of disk arrays, wherein the second copy of the data is staggered with respect to the first copy on the plurality of disk arrays.

23 Claims, 10 Drawing Sheets

Define N = 3 (Number Of Copies)
Define VLUN Data Size = 1280

| Figure 8 - Steps | | | 204 | 206 | 208 | 212 | 213 | 214 | 215 |
|---|---|---|---|---|---|---|---|---|---|
| Stripe | VLUN Block | Copy | VLUN Data Index | Block Offset | Array Data Index | Disk Array ID | Array Stripe Index | Starting LBA Of Stripe | Disk Array Block |
| $A_1$ | 560 | 0 | 0 | 560 | 0 | 1 | 0 | 0 | 560 |
| $A_2$ | 560 | 1 | 0 | 560 | 0 | 2 | 1 | 1280 | 1840 |
| $A_3$ | 560 | 2 | 0 | 560 | 0 | 3 | 2 | 2560 | 3120 |
| $B_1$ | 1287 | 0 | 1 | 7 | 0 | 2 | 0 | 0 | 7 |
| $B_2$ | 1287 | 1 | 1 | 7 | 0 | 3 | 1 | 1280 | 1287 |
| $B_3$ | 1287 | 2 | 1 | 7 | 0 | 1 | 2 | 2560 | 2567 |
| $C_1$ | 2586 | 0 | 2 | 26 | 0 | 3 | 0 | 0 | 26 |
| $C_2$ | 2586 | 1 | 2 | 26 | 0 | 1 | 1 | 1280 | 1306 |
| $C_3$ | 2586 | 2 | 2 | 26 | 0 | 2 | 2 | 2560 | 2586 |
| $D_1$ | 3842 | 0 | 3 | 2 | 1 | 1 | 3 | 3840 | 3842 |
| $D_2$ | 3842 | 1 | 3 | 2 | 1 | 2 | 4 | 5120 | 5122 |
| $D_3$ | 3842 | 2 | 3 | 2 | 1 | 3 | 5 | 6400 | 6402 |
| $E_1$ | 5600 | 0 | 4 | 480 | 1 | 2 | 3 | 3840 | 4320 |
| $E_2$ | 5600 | 1 | 4 | 480 | 1 | 3 | 4 | 5120 | 5600 |
| $E_3$ | 5600 | 2 | 4 | 480 | 1 | 1 | 5 | 6400 | 6880 |
| $F_1$ | 6465 | 0 | 5 | 65 | 1 | 3 | 3 | 3840 | 3905 |
| $F_2$ | 6465 | 1 | 5 | 65 | 1 | 1 | 4 | 5120 | 5185 |
| $F_3$ | 6465 | 2 | 5 | 65 | 1 | 2 | 5 | 6400 | 6465 |

FIGURE 9

Define N = 2 (Number Of Copies)
Define VLUN Data Size = 1280

| Figure 8 - Steps | | 204 | 206 | 208 | 212 | 213 | 214 | 215 |
|---|---|---|---|---|---|---|---|---|
| Stripe | VLUN Block | Copy | VLUN Data Index | Block Offset | Array Data Index | Disk Array ID | Array Stripe Index | Starting LBA Of Stripe | Disk Array Block |
| $A_1$ | 560 | 0 | 0 | 560 | 0 | 1 | 0 | 2560 | 3120 |
| $A_2$ | 560 | 1 | 0 | 560 | 0 | 2 | 1 | 0 | 560 |
| $B_1$ | 1287 | 0 | 1 | 7 | 0 | 2 | 1 | 2560 | 2567 |
| $B_2$ | 1287 | 1 | 1 | 7 | 0 | 3 | 1 | 2560 | 2567 |
| $C_1$ | 2586 | 0 | 2 | 26 | 0 | 3 | 1 | 3840 | 3866 |
| $C_2$ | 2586 | 1 | 2 | 26 | 0 | 1 | 1 | 3840 | 3866 |
| $D_1$ | 3842 | 0 | 3 | 2 | 1 | 1 | 2 | 0 | 2 |
| $D_2$ | 3842 | 1 | 3 | 2 | 1 | 2 | 3 | 1280 | 1282 |
| $E_1$ | 5600 | 0 | 4 | 480 | 1 | 2 | 2 | 3840 | 4320 |
| $E_2$ | 5600 | 1 | 4 | 480 | 1 | 3 | 3 | 6400 | 6880 |
| $F_1$ | 6465 | 0 | 5 | 65 | 1 | 3 | 2 | 5120 | 5185 |
| $F_2$ | 6465 | 1 | 5 | 65 | 1 | 1 | 3 | 5120 | 5185 |

FIGURE 10

STAGGERED WRITING FOR DATA STORAGE SYSTEMS

The present invention relates to write operations in data storage systems. This application incorporates herein by reference as follows:

U.S. application Ser. No. 10/677,660, Systems and Methods of Multiple Access Paths to Single Ported Storage Devices, filed on Oct. 1, 2003

U.S. application Ser. No. 10/696,327, Data Replication in Data Storage Systems, filed on Oct. 28, 2003, now U.S. Pat. No. 7,143,122 B2 and U.S. application Ser. No. 10/837,322, Guided Configuration of Data Storage Systems, filed on Apr. 30, 2004, now U.S. Pat. No. 7,216,192 B2.

BACKGROUND

Today, many data storage systems use redundant array of inexpensive disks (RAID) technology. Chen et al., RAID: *High-Performance, Reliable Secondary Storage* (1994) gives an overview of RAID levels 0-6 and is incorporated herein by reference.

In RAID 0, an array controller stripes data across the disk array and accesses data in parallel which increases I/O performance. RAID 0 has good write performance because it has no need to update redundant data, but has decreased reliability because there is no data redundancy. Loss of a single disk in the array results in data loss. Also, the data distributed on N identical disks of a disk array has 1/N the reliability of a single disk.

In RAID 1, when an array controller writes data to a disk, it also writes the data to a redundant disk. The array controller can read data from either disk, and if one disk fails, the array controller can read the data from the other disk increasing reliability but RAID 1 doubles the storage required so is expensive.

In RAID 5, an array controller writes the data and the parity over the disk array. The array controller stores the parity of the data as blocks associated with a set of data blocks when it writes data, and updates that parity data as data is changed by further write operations. If one disk fails, its data can be reconstructed by reading the remaining disks and the parity disk. This permits all of the disks to service a read request, but write requests tend to be less efficient, because they must read-modify-write the parity of the data.

SUMMARY OF THE INVENTION

The present invention relates to write operations in data storage systems. In an embodiment, the invention relates to a method of writing data across a plurality of storage devices (e.g., disk arrays), comprising writing a first copy of the data as a first plurality of stripes corresponding to the plurality of disk arrays and writing a second copy of the data as a second plurality of stripes corresponding to the plurality of disk arrays, wherein the second copy of the data is staggered with respect to the first copy on the plurality of disk arrays. In another embodiment, the invention relates to a data storage system comprising a plurality of storage devices (e.g., disk arrays) and a host, coupled to the plurality of disk arrays, with a program instructing the host to write a first copy of the data as a first plurality of stripes that correspond to the plurality of disk arrays and to write a second copy of the data as a second plurality of stripes that correspond to the plurality of disk arrays, wherein the second copy of the data is staggered with respect to the first copy on the plurality of disk arrays. In either embodiment, the invention can be extended to N copies.

BRIEF DESCRIPTION OF THE DRAWINGS

FIG. 9 is a table illustrating how the method of FIG. 8 writes three copies of blocks in the stripes A-F to disk arrays 1-3 as shown in FIG. 4.

FIG. 10 is a table illustrating how the method of FIG. 8 writes three copies of blocks in the stripes A-F to disk arrays 1-3 as shown in FIG. 5.

DETAILED DESCRIPTION OF THE PREFERRED EMBODIMENTS

The following description includes the best mode of carrying out the invention, illustrates the principles of the invention, and should not be taken in a limiting sense. The scope of the invention is determined by reference to the claims. Each part or step is assigned its own number in the specification and drawings.

Figure 1:
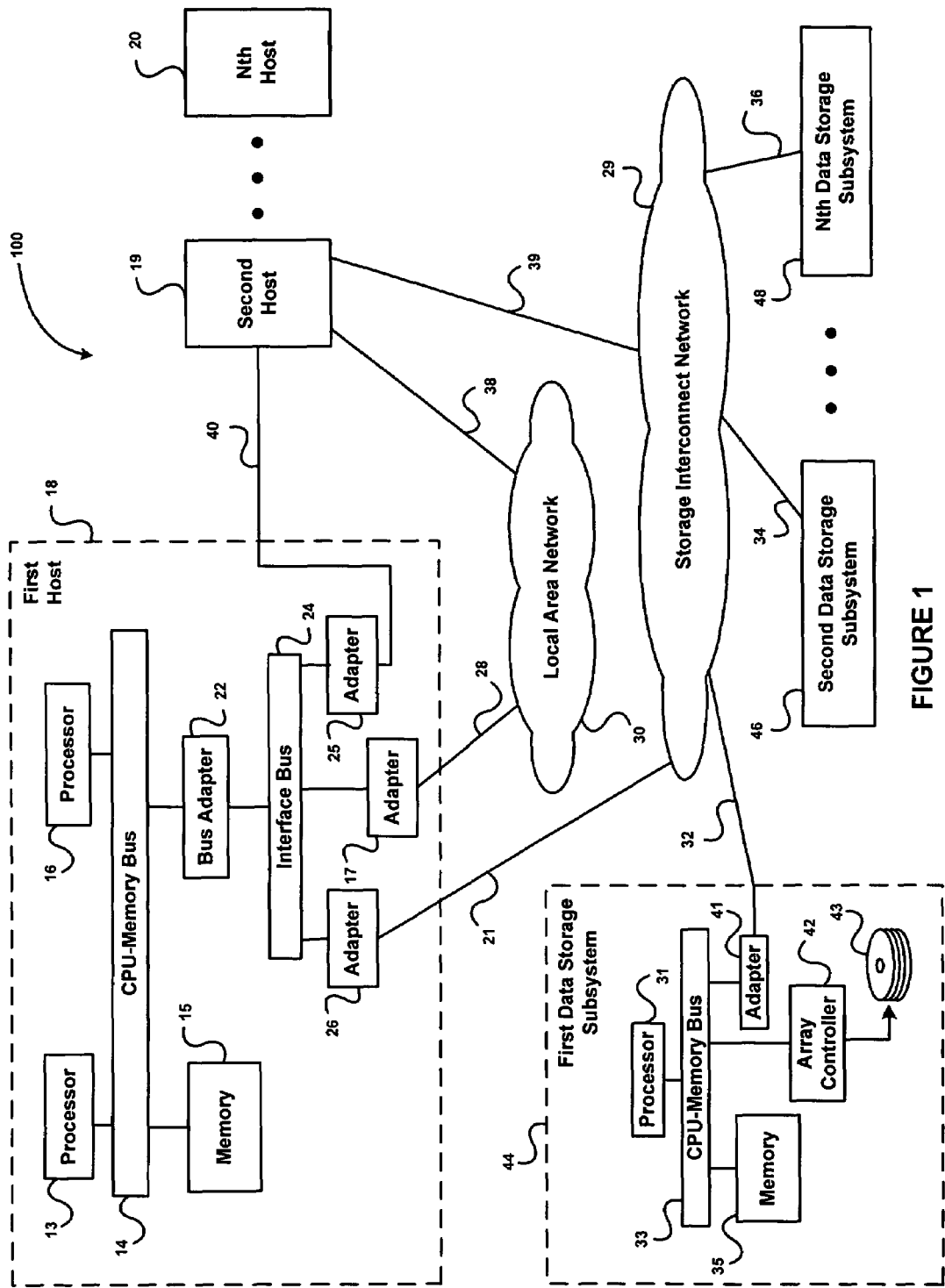
FIG. 1 illustrates a data storage system and details of a first host and of a first data storage subsystem.

FIG. 1 illustrates a data storage system 100 that includes first through Nth hosts 18,19 and 20, and first through Nth data storage subsystems 44, 46 and 48. Each host is a computer that can connect to clients, data storage subsystems and other hosts using software/hardware interfaces such as network interface cards and software drivers to implement Ethernet, Fibre Channel, ATM, SCSI, and/or InfiniBand. Hennessy and Patterson, *Computer Architecture: A Quantitative Approach* (2003), and Patterson and Hennessy, *Computer Organization and Design: The Hardware/Software Interface* (2004) describe computer hardware and software, storage systems, memory, caching and networks and are incorporated herein by reference.

Each host runs an operating system such as Linux, UNIX, a Microsoft OS, or another suitable operating system. Tanenbaum, *Modern Operating Systems* (2001) describes operating systems in detail and is incorporated herein by reference.

FIG. 1 shows the first host 18 includes a CPU-memory bus 14 that communicates with the processors 13 and 16 and a memory 15. The processors 13 and 16 used are not essential to the invention and could be any suitable general-purpose processor such as an Intel Pentium processor, an ASIC dedicated to perform the operations described herein, or a field programmable gate array (FPGA).

Each host includes a bus adapter 22 between the CPU-memory bus 14 and an interface bus 24, which in turn interfaces with network adapters 17, 25 and 26. The first host 18 communicates through the network adapter 25 over a link 40 with a second host 19. The first host 18 can also communicate through the network adapter 17 over link 28 with the local area network (LAN) 30. The first host 18 also communicates through the network adapter 26 over a link 21 with a storage interconnect network 29. Similarly, the second host 19 communicates over links 38 and 39 with the LAN 30 and the storage interconnect network 29, respectively. The storage interconnect network 29 also communicates over links 32, 34, and 36 with the data storage subsystems 44, 46, and 48, respectively.

In sum, the hosts 18, 19 and 20 communicate with each other, the LAN 30 and storage interconnect network 29 and data storage subsystems 44, 46, and 48.

The LAN 30 and the storage interconnect network 29 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, The FibreChannel Consultant, *A Comprehensive Introduction* (1998), Kembel, The FibreChannel Consultant, *Arbitrated Loop* (1996-1997) The FibreChannel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated herein by reference.

FIG. 1 shows the first data storage subsystem 44 includes a CPU-memory bus 33 that communicates with the processor 31 and a memory 35. The processor 31 used is not essential to the invention and could be any suitable general-purpose processor such as an Intel Pentium processor, an ASIC dedicated to perform the operations described herein, or a field programmable gate array (FPGA). The CPU-memory bus 33 also communicates through an adapter 41 and link 32 with the storage interconnect network 29 and an array controller 42, such as a RAID controller, interfacing with an array of storage devices (e.g., a disk array 43).

U.S. application Ser. No.10/677,560, Systems and Methods of Multiple Access Paths to Single Ported Storage Devices, filed on Oct. 1, 2003 describes suitable data storage subsystems, each containing a disk array, and is incorporated by reference herein. In an alternative embodiment, any other suitable array of storage devices can replace the disk arrays (e.g. an array of tape drives or an array of nonvolatile semiconductor memory). Massiglia, *The RAID Book: A Storage System Technology Handbook* (6th Edition, 1997) describing RAID technology is incorporated herein by reference.

A host may access secondary storage devices (e.g., disk drives) through a VLUN (virtual logical unit) that abstracts the storage device(s) as a linear array of fixed-size blocks. A logical block address (LBA) identifies each fixed-sized block. The data storage system constructs a VLUN from all or parts of several physical storage devices such as disk drives. To make a large VLUN, a data storage system may concatenate space allocated from several storage devices. To improve performance, the data storage system maps adjacent regions of VLUN space onto different physical storage devices (striping). To improve reliability, the system holds multiple copies of a VLUN on different storage devices (mirroring).

Users request write and read operations of the data storage system 100. In operation, a user requests an I/O operation of one of the hosts 18,19, or 20 which will transmit a command (or I/O request) on the LAN 30 or the storage interconnect network 29 to one of the data storage subsystems 44, 46, or 48.

If a write is received, the data storage subsystem 44 can use a write-through scheme and not acknowledge the write until the data is written to nonvolatile memory (e.g., disk array 43). This ensures data consistency between the host and data storage subsystem.

In a write-back scheme, the data storage subsystem 44 can acknowledge the write before data is written to a disk array 43 as long as the data is stored in another form of nonvolatile memory (e.g., battery backed RAM) until written to the disk array to ensure data consistency in the event of a power failure, etc.

Figure 2:
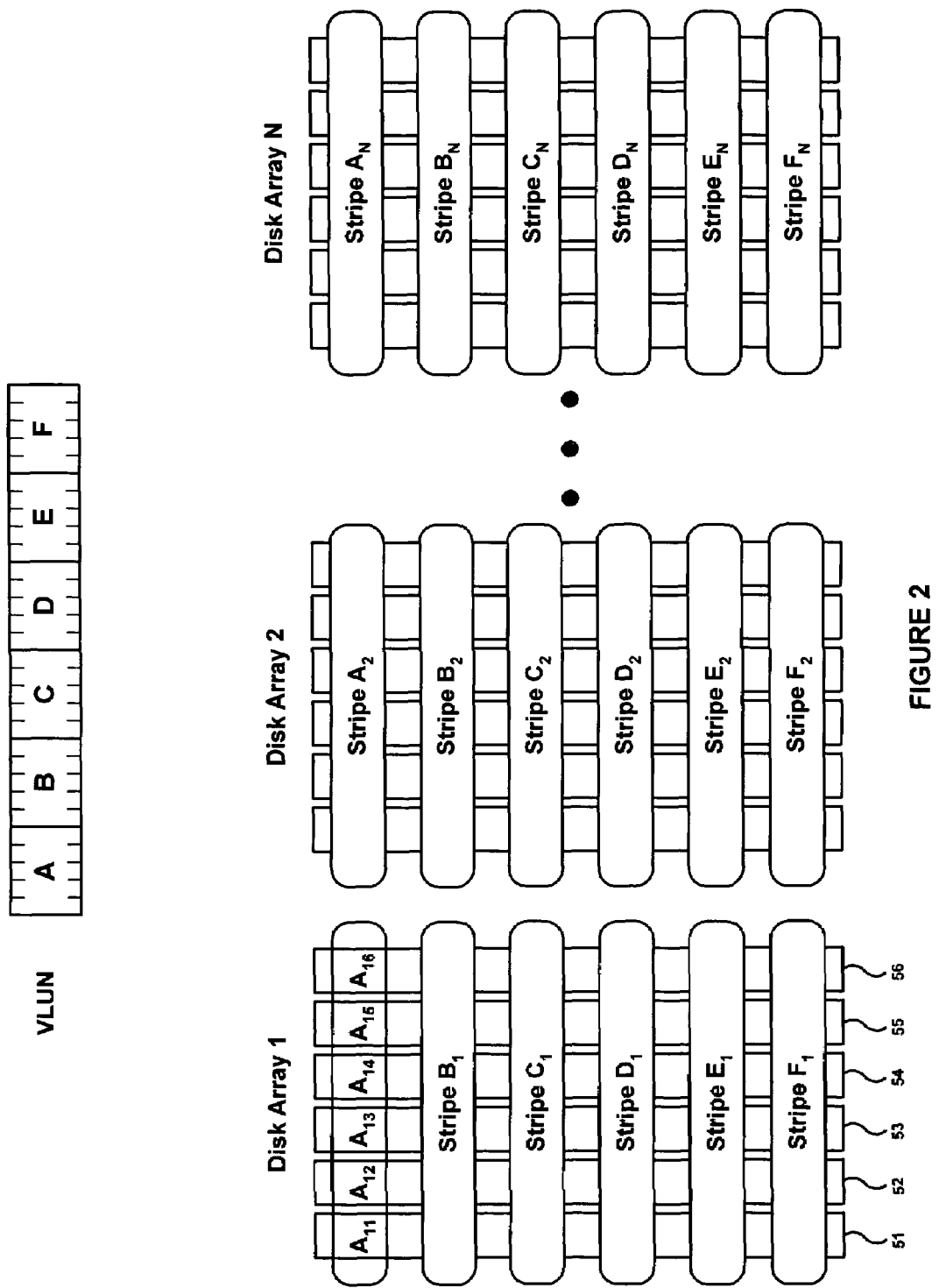
FIG. 2 illustrates a VLUN that contains data that is written as stripes A-F to disk arrays 1-N.

FIG. 2 illustrates a VLUN containing data A-F. A host may write copies 1-N of the data A-F to the disk arrays 1-N. Each disk array contains a copy of data A-F, and the subscripts indicate the copy on the disk array. Thus, the host writes the first copy of the data A-F as stripes $A_1$ through $F_1$, on the disk array 1. Similarly, the host writes the second copy of the data A-F as stripes $A_2$ through $F_2$ on disk array 2. Finally, the host writes copy N of the data A-F as stripes $A_N$ through $F_N$ on disk array N.

Each stripe is made of strips written on corresponding disks. For example, stripe $A_1$ is written across the six disks of disk array 1. In RAID 5, the array controller writes stripe $A_1$ made of strips $A_{11}$-$A_{16}$ on the disks 51-56. Strips $A_{11}$-$A_{15}$ contain the data and strip $A_{16}$ the parity of strips $A_{11}$-$A_{15}$. In an embodiment, the stripe $A_1$ is 768 KB and each strip is 128 KB. In RAID 5, if any disk in the disk array fails, the data can be recovered from the other disks.

If any disk array fails (e.g., two disks in the disk array fail or the array controller fails), the host can access the data from another disk array. To support fault tolerance, when writing data to the VLUN, the host writes the data to all of the disk arrays. When reading data from the VLUN, any copy can be used.

Figure 3:
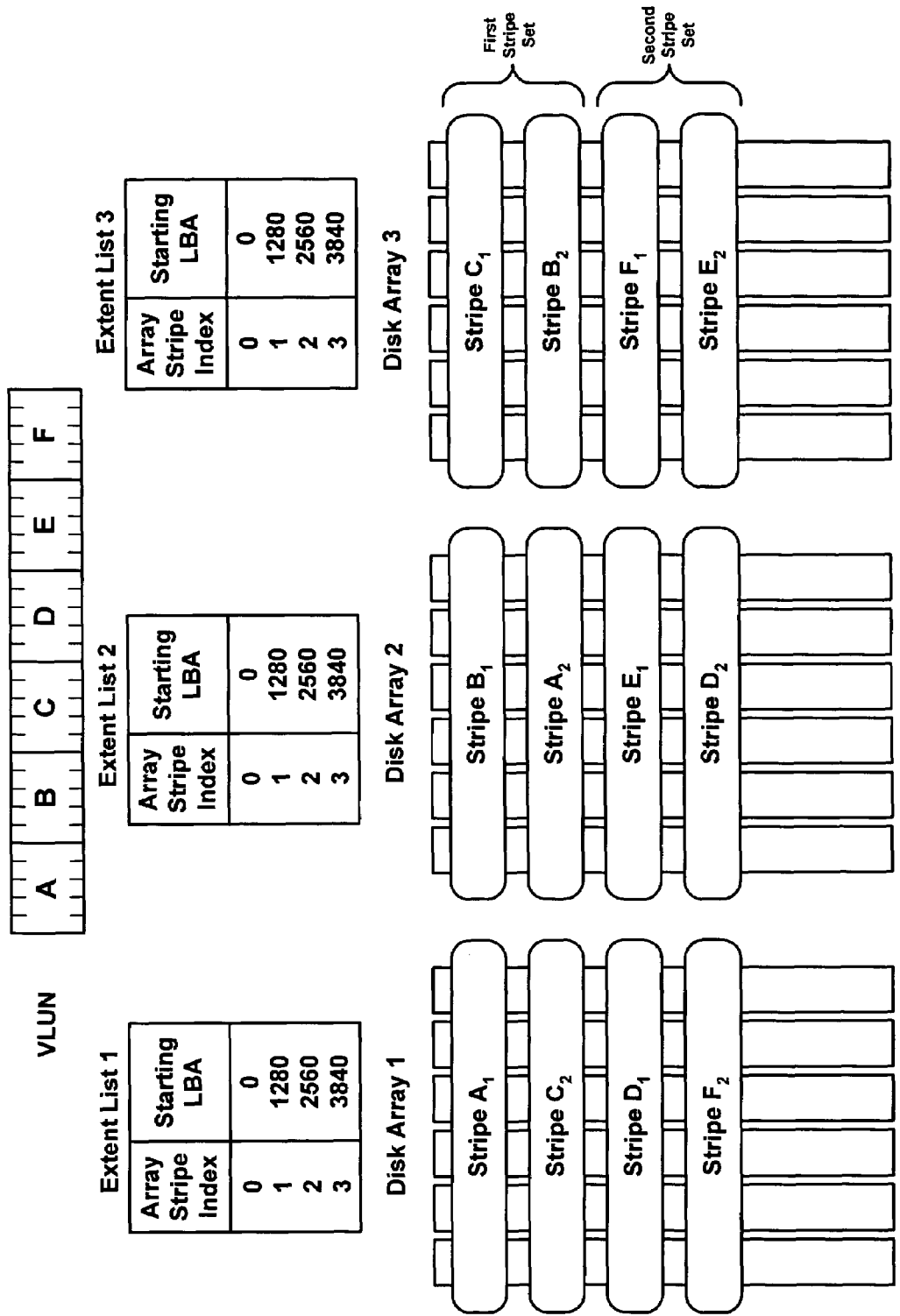
FIG. 3 illustrates two staggered copies of a VLUN that contains data that is written as stripes A-F to disk arrays 1-3.

FIG. 3 illustrates two staggered copies of a VLUN containing data A-F that the host will write as stripes A-F to the disk arrays 1-3. The host writes each copy of the stripes A-F across the disk arrays 1-3 rather than to a single disk array. This embodiment protects against failure of a single disk array and provides striping performance.

The host writes the first copy of A-C as stripe $A_1$ to disk array 1, stripe $B_1$ to disk array 2, and stripe $C_1$ to disk array 3. Next, the host writes the second copy of A-C as stripe $C_2$ to disk array 1, stripe $A_2$ to disk array 2, and stripe $B_2$ to disk array 3. The host staggers the second copy with respect to the first copy so that two copies of any given stripe (e.g., A, B, or C) do not reside on the same disk array. Thus, the host staggers the second copy of stripe A:$A_1$ is stored on disk array 1, while $A_2$ is stored on disk array 2. This staggering writing of the stripes completes the first stripe set, i.e., stripes A-C.

Subsequent sets of stripes can be staggered in the same pattern. For example, the host can write the second stripe set, i.e., stripes D-F by writing stripe $D_1$ to disk array 1, stripe $E_1$ to disk array 2, and stripe $F_1$ to disk array 3, and staggering stripe $F_2$ to disk array 1, stripe $D_2$ to disk array 2, and stripe $E_2$ to disk array 3. This again avoids storing two copies of a stripe (e.g., D, E, or F) on the same disk array. This is writing in round robin across the plurality of disk arrays. This striping supports the ability to write full stripes under RAID 5.

FIG. 3 illustrates that each disk array has its own extent list. Thus, extent list 1 corresponds to disk array 1, extent list 2 to disk array 2, and so forth.

Figure 6:
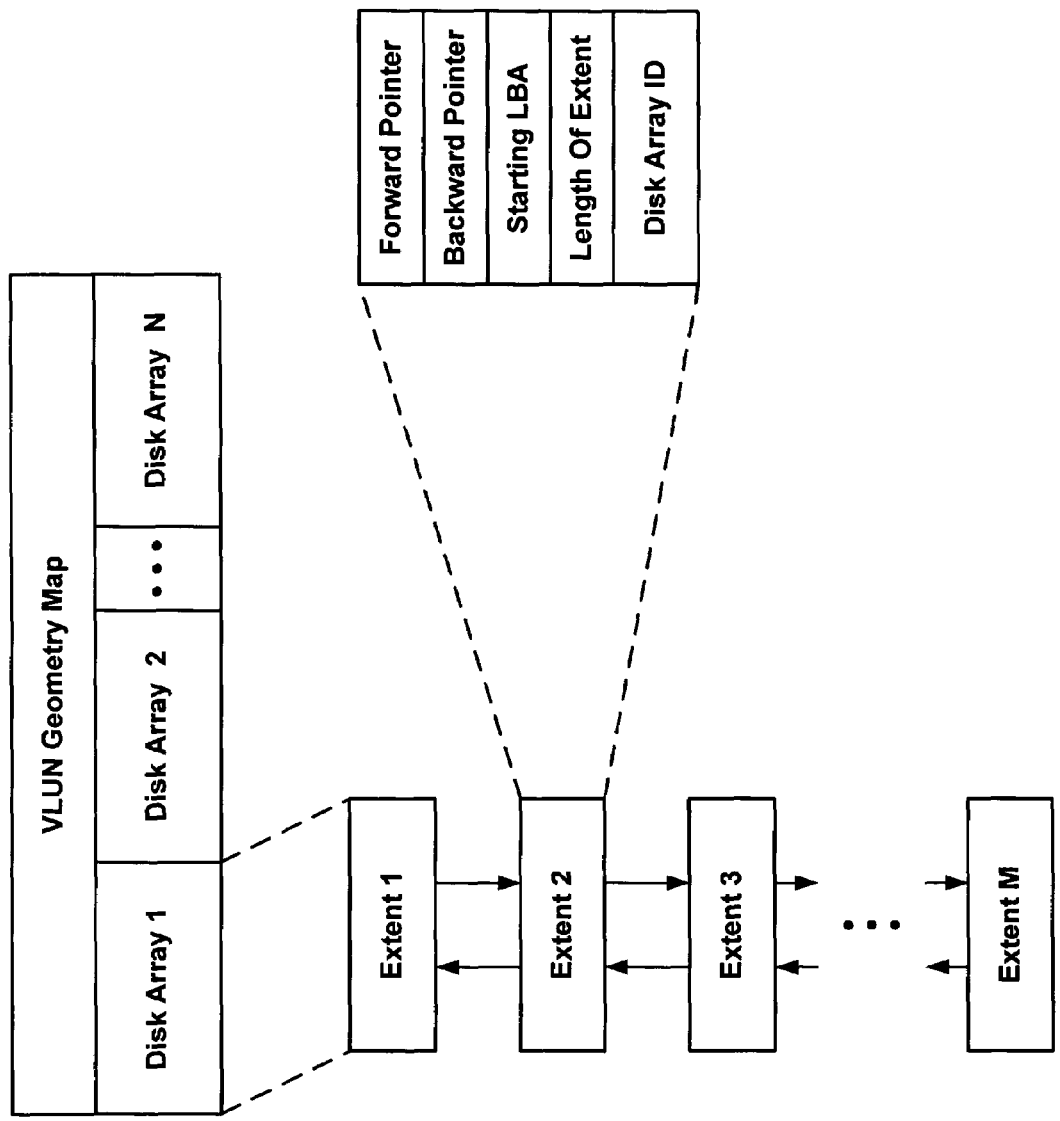
FIG. 6 illustrates a VLUN geometry map for disk arrays 1-N.

The extent lists contain information about the stripes and the space allocated on the disk arrays as detailed in FIG. 6.

In FIG. 3, we show the array stripe index and starting LBAs of each stripe in an extent list. For example, extent list 1 has the starting LBAs of the stripes of disk array 1: the starting LBA of stripe $A_1$=0, the starting LBA of stripe $C_2$=1280, the starting LBA of stripe $D_1$=2560, and the starting LBA of stripe $F_2$=3840. Extent list 2 has the starting LBAs for stripes $B_1$, $A_2$, $E_1$, and $D_2$. Extent list 3 has the starting LBAs for the stripes $C_1$, $B_2$, $F_1$, and $E_2$.

Figure 7:
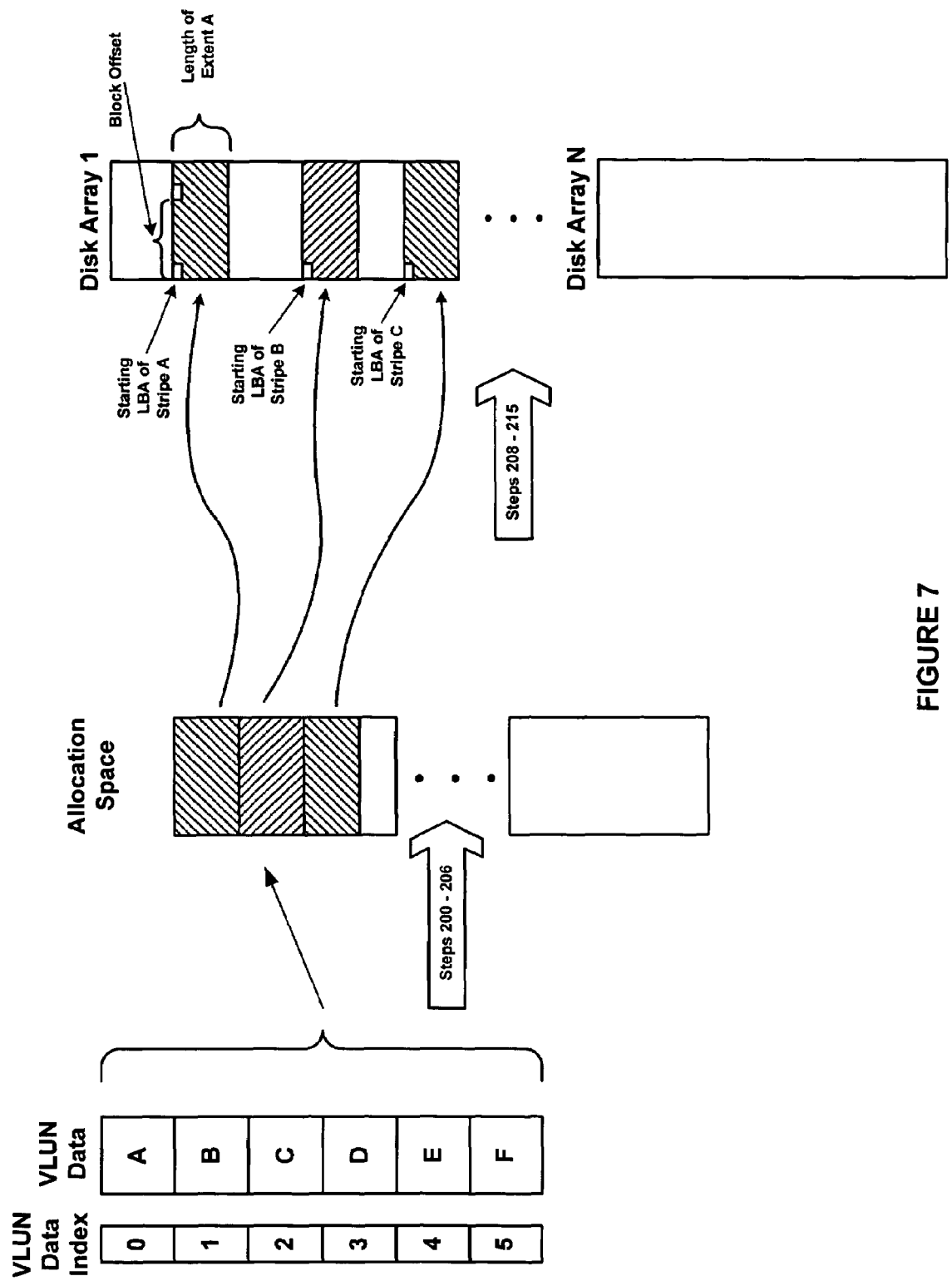
FIG. 7 illustrates mapping from a VLUN to an allocation space to a disk array 1.
Figure 8:
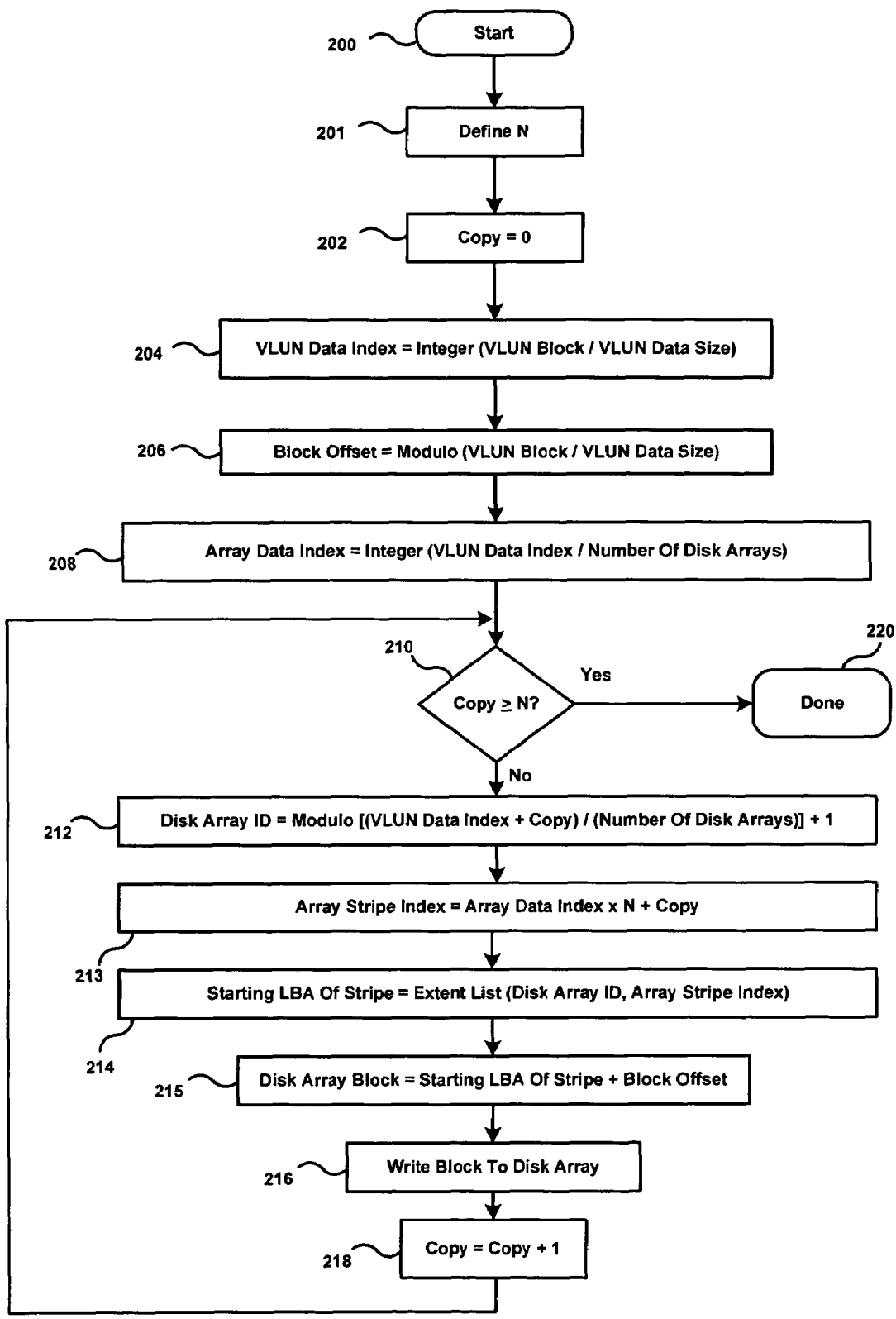
FIG. 8 illustrates a method of writing a data block across a plurality of disk arrays.

In the embodiment of FIG. 3, the LBAs address 512-byte blocks. In alternative embodiments, the LBAs address any fixed-size blocks. In the RAID 5 geometry illustrated (e.g., five data disks plus a parity disk), the starting LBA of the first stripe=0, the starting LBA of the second stripe is 1280 and so forth. Staggering the stripes can extend to three or more copies. The extent list provides array stripe indexes to address the starting LBAs of the stripes. FIGS. 7-8 and accompanying specification give further details regarding the array stripe index.

Figure 4:
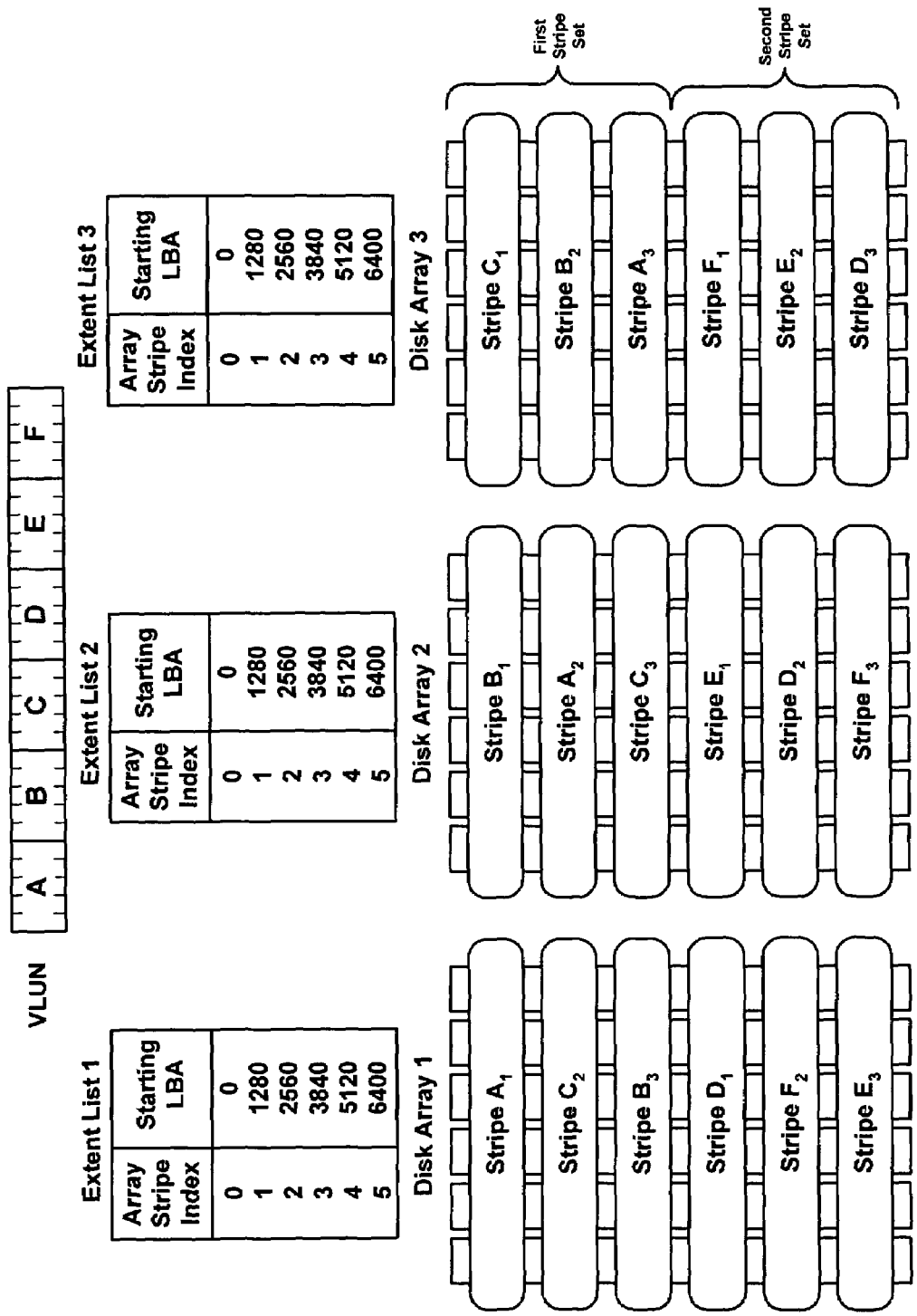
FIG. 4 illustrates three staggered copies of a VLUN that contains data that is written as stripes A-F to disk arrays 1-3.

FIG. 4 illustrates three staggered copies of a VLUN that contains data that the host writes as stripes A-F to disk arrays 1-3. This embodiment protects against failure of two disk arrays. The host writes each copy of the stripes A-F across the disk arrays 1-3.

As in FIG. 3, the host writes stripe $A_1$ to disk array 1, stripe $B_1$ to disk array 2, and stripe $C_1$ to disk array 3 to store the first copy. Next, the host writes stripe $C_2$ to disk array 1, stripe $A_2$ to disk array 2, and stripe $B_2$ to disk array 3 to store the second copy. The host writes stripe $B_3$ to disk array 1, stripe $C_3$ to disk array 2, and stripe $A_3$ to disk array 3 to store the third copy. In this arrangement, the host staggers the stripes of the first, second and third copies to avoid placing two copies of the stripe on the same disk array. This staggering of the stripes completes the first stripe set, that is, stripes A-C.

Also as in FIG. 3, the host writes the second stripe set, that is, stripes D-F by writing stripe $D_1$ to disk array 1, stripe $E_1$ to disk array 2, and stripe $F_1$ to disk array 3 to store the first copy. Next, the host staggers the second copy by writing stripe $F_2$ to disk array 1, stripe $D_2$ to disk array 2, and stripe $E_2$ to disk array 3. Next, the host staggers the third copy by writing stripe $E_3$ to disk array 1, stripe $F_3$ to disk array 2, and stripe $D_3$ to disk array 3. This embodiment avoids writing two copies of any stripe (e.g., A, B, C, D, E, or F) on one disk array and completes the second stripe set, that is, the stripes D-F. If additional copies of the VLUN are desired (e.g., more than three copies), the host can stagger subsequent stripe sets in the same pattern. Staggered mirroring for N copies requires at least N arrays.

The disk arrays 1-3 of FIG. 4 have corresponding extent lists 1-3 similar to the lists shown in FIG. 3, but with additional starting LBAs (e.g., 5120 and 6400) and array stripe indexes to address the starting LBAs of the stripes of the third copy.

Figure 5:
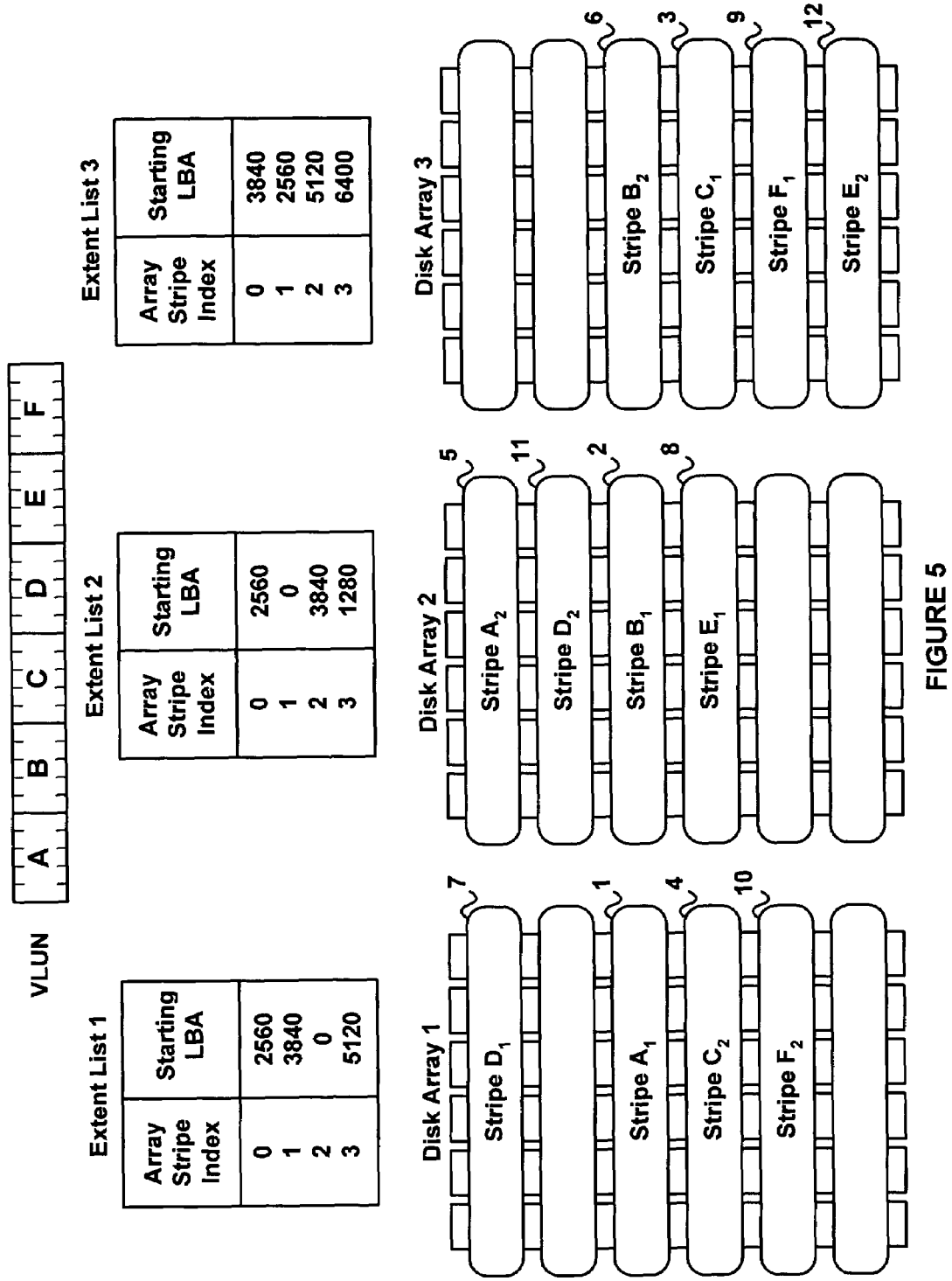
FIG. 5 illustrates two staggered copies of a VLUN that contains data that is written as stripes A-F to noncontiguous free space on disk arrays 1-3.

FIG. 5 illustrates two staggered copies of a VLUN that contains data that the host writes as stripes A-F to noncontiguous free space on the disk arrays 1-3. The free space becomes noncontiguous over time as the host allocates and deletes VLUNs on one or more disk arrays. The stripes of other VLUNs and free space are represented by the blanks in each disk array shown.

The extent lists allow the host to write the stripes at noncontiguous locations on the disk arrays to overcome fragmentation. Each extent on the extent list contains the starting LBAs of each stripe on the disk array to show where the host has allocated space for the VLUN.

Tanenbaum, *Modern Operating Systems* (2001), incorporated herein by reference, describes techniques for tracking of free space on secondary storage devices such as hard disk drives on pages 413-414. In an embodiment, a bit map tracks the allocation status of the stripes on each disk array. The host will set a bit of the bit map to 1 when it allocates a corresponding stripe and set the bit to 0 when it deallocates the corresponding stripe. Another embodiment uses linked lists of disk blocks.

As shown in FIG. 5, the host uses the extent lists 1-3 to write stripes A-F to the disk arrays 1-3 as follows:

| Identifier | Stripe | LBA | Disk Array |
|---|---|---|---|
| 1 | $A_1$ | 2560 | 1 |
| 2 | $B_1$ | 2560 | 2 |
| 3 | $C_1$ | 3840 | 3 |
| 4 | $C_2$ | 3840 | 1 |
| 5 | $A_2$ | 0 | 2 |
| 6 | $B_2$ | 2560 | 3 |
| 7 | $D_1$ | 0 | 1 |
| 8 | $E_1$ | 3840 | 2 |
| 9 | $F_1$ | 5120 | 3 |
| 10 | $F_2$ | 5120 | 1 |
| 11 | $D_2$ | 1280 | 2 |
| 12 | $E_2$ | 6400 | 3 |

The identifiers 1-12 are to help the reader find the stripes in the disk arrays rather than indicate the writes be done in a certain order (e.g., ascending, descending, or in sequential steps). The write operation can extend to three or more copies.

FIG. 6 illustrates a VLUN geometry map for disk arrays 1-N allowing flexible allocation of space. Although the VLUN geometry map allows placement of individual stripes on the disk array the data storage system will typically allocate space in units that are multiples of approximately 256 megabytes to keep the size of the VLUN geometry map acceptably small.

Each disk array has its own extent list. The extent list among other things indicates the range of blocks allocated for the VLUN. Each extent list includes extents such as extents 1-M. Each extent contains forward and backward pointers so the host can search and maintain the extent list. Each extent also includes the starting LBA and length of the extent to indicate the contiguous space allocated for the VLUN on the disk array. Finally, the disk array ID identifies the disk array containing the allocation. In an alternative embodiment, the extent list could be implemented by a different data structure such an array, a singly linked list, a tree, or a hash table. Cormen, *Introduction to Algorithms* (2nd Ed. 2001) describes the details of such data structures and is incorporated herein by reference.

FIG. 7 illustrates a map from a VLUN to allocation space to disk arrays. During the write operation, the host allocates disk array space (e.g., 2 GB) beginning at the offset for data A-F. The data A, B, C, represented by cross-hatching, occupy part of the allocation space. The host writes, for example, VLUN data A, B, C as stripes A, B, C beginning at each of their starting LBAs. Each stripe, for example, stripe A, has a range of disk blocks referred to as the length of the extent. As discussed in FIG. 8, the host performs steps 200-206 to map from the VLUN to allocation space and steps 208-215 to map from allocation space to the disk array block.

FIG. 8 illustrates a method of writing N copies of a block in a staggered arrangement. For brevity, we will describe a host as performing the method with the understanding that preferably a higher-level software program (e.g., written in the C programming language) will instruct the host to execute the method.

The method begins at step 200. At step 201, the user will enter the value of N to define the number of copies of the block that will be written to the disk arrays. At step 202, the host assigns zero to a variable named Copy that increments each time a copy of the block is written to a disk array. At step 204, the host calculates the VLUN data index by dividing the VLUN block by the VLUN data size, both in units of blocks addressable as LBAs. The integer math result is the VLUN data index of the VLUN data A, B, C, D, E, or F where the VLUN block resides. As shown in FIG. 7, the VLUN data index 0-5 correspond to the VLUN data A-F. At step 206, the host determines the offset of the block within the VLUN data by calculating the modulo of the VLUN block divided by the VLUN data size, both in units of blocks addressable as LBA. The modulo is the remainder of the integer division computation. At step 208, the host computes the array data index by dividing the VLUN data index by the number of disk arrays. At step 210, the host compares the value of Copy to the total copies N to be written to the disk array. If the host has written all copies of the block to the disk arrays, the host is done and proceeds to step 220. If the host is not done, at step 212 the host calculates the disk array ID of the disk array where the block is to be written by adding the VLUN data index to Copy, dividing the sum by the number of disk arrays, computing the modulo, and adding 1 since the disk arrays are indexed from 1 to N. At step 213, the host calculates the array stripe index (e.g., FIGS. 3-5) by multiplying the array data index by N and adding Copy. At step 214, the host uses the disk array ID to find the appropriate extent list, then looks up the starting LBA of the stripe using the array stripe index. At step 215, the host computes the disk array block by adding the starting LBA of the stripe and the block offset. At step 216, the host writes the block to the disk array at the location specified by the disk array ID and the disk array block. At step 218, the host increments Copy and returns to the test at step 210 to determine if the write operation is complete.

FIG. 9 illustrates the method of FIG. 8 where the host writes blocks within the stripes A-F in a staggered arrangement to disk arrays 1-3. We assume the host receives requests to write VLUN blocks 560, 1287, 2586, 3842, 5600, and 6465 to the disk arrays 1-3, N=3 copies, and VLUN data size is 1280, which is preferably the stripe size.

FIG. 10 illustrates the method of FIG. 8 where the host writes blocks within the stripes A-F in a staggered arrangement to disk arrays 1-3. We assume the host receives requests to write VLUN blocks 560, 1287, 2586, 3842, 5600, and 6465 to the disk arrays 1-3, N=2 copies, and VLUN data size is 1280, which is preferably the stripe size.

One embodiment of the method uses the extent lists as described in steps 213-214. In an alternative embodiment, the method uses the extent lists illustrated in FIG. 6, and the host must search the extent lists to determine which extent contains the array stripe index and obtain the starting LBA of the stripe from that extent.

What is claimed:

1. A method of writing data across a plurality of disk arrays in a data storage system, comprising:
   writing a first copy of the data as a first plurality of stripes corresponding to the plurality of disk arrays; and
   writing a second copy of the data as a second plurality of stripes corresponding to the plurality of disk arrays, wherein the second copy of the data is staggered with respect to the first copy of the data so that no two copies of any stripe are written to one of the plurality of disk arrays.

2. The method of claim 1, wherein the second copy is staggered from the first copy by one disk array.

3. The method of claim 1, further comprising the step of writing the data of a VLUN to the plurality of disk arrays.

4. The method of claim 1, further comprising the step of writing the data of a VLUN to noncontiguous free space on the plurality of disk arrays.

5. The method of claim 4, further comprising the step of describing the noncontiguous free space allocated on each of the plurality of disk arrays in an extent list.

6. The method of claim 5, wherein the extent list includes a plurality of extents, each extent including a starting LBA, a length of extent, an offset, and a disk array ID.

7. The method of claim 1, wherein the writing of the first and second copy of the data includes writing in round robin across the plurality of disk arrays.

8. The method of claim 1, wherein the writing of the data includes writing the data in fixed-size blocks.

9. The method of claim 1, further comprising implementing RAID 5 in the plurality of disk arrays.

10. The method of claim 9, further comprising writing the data from a VLUN as a multiple of the RAID 5 stripe length.

11. The method of claim 1, further comprising writing a third copy of the data as a third plurality of stripes that correspond to the plurality of disk arrays, wherein the third copy of the data is staggered with respect to the first copy and the second copy of the data on the plurality of disk arrays.

12. A date storage system comprising:
   a plurality of disk arrays in data storage subsystems; and
   a host, coupled to the plurality of disk arrays, programmed to instruct the host to write a first copy of the data as a first plurality of stripes that correspond to the plurality of disk arrays and to write a second copy of the data as a second plurality of stripes that correspond to the plurality of disk arrays, wherein the second copy of the data is staggered with respect to the first copy of the data on the plurality of disk arrays.

13. The data storage system of claim 12, further comprising a VLUN containing data accessible to the host.

14. The data storage system of claim 13, further comprising a VLUN geometry map accessible to the host to indicate the space allocated for the first and second copies of the data on the plurality of disk arrays.

15. The data storage system of claim 14, wherein the VLUN geometry map includes extent lists.

16. The data storage system of claim 15, wherein the extent list includes a plurality of extents, wherein each extent includes a starting LBA, a length of extent, an offset, and a disk array ID.

17. The data storage system of claim 12, wherein no two copies of any stripe are written to one of the plurality of disk arrays.

18. The data storage system of claim 12, wherein the plurality of disk arrays implement RAID 5.

19. The data storage system of claim 18, wherein the date includes RAID 5 stripes made up of multiple strips.

20. The data storage system of claim 12, wherein the host is programmed to write the first and second copy of the data in round robin across the plurality of disk arrays.

21. The data storage system of claim 12, wherein the host is programmed to write the first and second copy of the data in fixed-size blocks.

22. The data storage system of claim 12, wherein the host is further programmed to write a third copy of the data as a third plurality of stripes that correspond to the plurality of disk arrays, wherein the third copy of the data is staggered with respect to the first copy and the second copy of the data on the plurality of disk arrays.

23. The data storage system of claim 22, wherein the host is further programmed to write four or more copies of the data as stripes that correspond to the plurality of disk arrays, wherein each copy of the data is staggered with respect to the other copies of the data on the plurality of disk arrays.

* * * * *